United States Patent [19]

McComas

[11] 3,918,925

[45] Nov. 11, 1975

[54] ABRADABLE SEAL

[75] Inventor: Charles C. McComas, Stuart, Fla.

[73] Assignee: United Technologies Corporation, Hartford, Conn.

[22] Filed: May 13, 1974

[21] Appl. No.: 469,270

[52] U.S. Cl. .......... 29/182.3; 277/96 B; 277/235 A; 29/182
[51] Int. Cl.$^2$ .......................................... B22F 3/00
[58] Field of Search .......... 29/182.3, 182; 277/96 B, 277/235 A

[56] References Cited
UNITED STATES PATENTS

| | | | |
|---|---|---|---|
| 3,575,427 | 4/1971 | Lapac | 277/96 B |
| 3,633,926 | 1/1972 | Hujniszak | 277/96 B |
| 3,817,719 | 6/1974 | Schilke et al. | 29/182 |

Primary Examiner—Benjamin R. Padgett
Assistant Examiner—Josephine Lloyd
Attorney, Agent, or Firm—John D. Del Ponti

[57] ABSTRACT

An abradable seal for use between relatively rotatable members in elevated temperature operating apparatus comprising a nickel aluminide coating approximately 0.005–0.010 inch thick bonded to one of said members, a voidless, inorganic water insoluble spinel compound layer approximately 0.005–0.05 inch thick bonded to the nickel aluminide coating consisting essentially of the air cured reaction product of, by weight, 20–40% sodium silicate, 55–75% aluminum and 2–8% zinc oxide, and an abradable material bonded to the inorganic coating selected from the group consisting of sintered metallic fiber, sintered metallic powder and metallic honeycomb.

5 Claims, No Drawings

ABRADABLE SEAL

BACKGROUND OF THE INVENTION

The invention herein described was made in the course of or under a contract or subcontract thereunder, with the Department of the Air Force.

It is known that the efficiency of a gas turbine engine is dependent upon the control of gas leakage between stages in both the compressor and turbine sections of the engine. Although the engine is typically designed and manufactured to very precise dimensional tolerances, it is necessary to provide a sufficient cold clearance between rotating elements and the surrounding assembly to accommodate the differential thermal growth between the parts as the engine assumes its normal operating temperature. To this cold clearance must be added the usual manufacturing tolerances plus an additional safety factor to provide for limited engine operation and temperatures in excess of the design temperatures. The requisite clearances thus provided are, however, generally not sufficiently close to permit the engine to operate at its maximum theoretical efficiency.

In order to maximize efficiency, it has been common practice to utilize an abradable surface on one of two relatively rotatable members to permit the rotating member to penetrate into the coating as a result of thermal and centrifugal expansion thereby providing what is essentially a zero clearance between members. Of course in order to be useful, the abradable material must not only be readily penetrated by the rotating member, such as a blade or a knife edge, but must permit the same with little or no wear while withstanding the elevated engine operating temperatures and erosive hot gases. Typically the oxidation resistant nickel chromium alloys in the form of sintered metallic fibers, sintered metallic powders and honeycomb have been utilized by brazing, welding or mechanical attachment to one of the members. Unfortunately however, the abradable materials employed in the prior art constructions have been unsatisfactory for usage with titanium alloy materials due to problems in bonding thereto. Attempts to braze, for example, have been unsuccessful since the braze alloy forms a titanium intermetallic which is brittle and lacking in tensile or shear strength. Overall, braze cycles are not normally compatible with titanium alloys and cause loss of mechanical properties in the hardware.

In addition, the need for the economic overhaul and replacement capability of the abradable coating materials, regardless of the base metal alloy, is paramount. One of the major considerations in the usage of contemporary seal materials is not only its lifetime but also its replaceability. For example, while various gold-nickel brazing materials are known to be effective in braze bonding sintered metallic fibers, sintered metallic powders or metallic honeycomb to a nickel alloy base, they are very expensive and perhaps more importantly their removal requires a machining operation which inherently removes parent metal and limits overhaul repeatability to a maximum of three or four times.

SUMMARY OF THE INVENTION

The present invention relates to an abradable seal facing material for use in elevated temperature operating apparatus and more particularly relates to a composite abradable seal structure for use in gas turbine engines at temperatures of 1,000°F for sustained operation and up to 1,050°F for short term operation. The present invention also relates to a method for making such a structure.

In brief, the present invention contemplates a composite abradable seal structure for use between two relatively rotating members in elevated temperature operating apparatus comprising a continuous nickel aluminide coating layer, preferably approximately 0.005–0.010 inch thick, bonded to at least one of said members, a voidless, inorganic water insoluble spinel compound layer approximately 0.005–0.050 inch thick bonded to said nickel aluminide coating consisting essentially of the air cured reaction product of, by weight, 20–40% sodium silicate, 55–75% aluminum and 2–8% zinc oxide, preferably 25–35% sodium silicate, 60–70% aluminum and 3–7% zinc oxide and optimally approximately 30% sodium silicate, 65% aluminum and 5% zinc oxide, and an abradable material layer bonded to said inorganic binder layer selected from the group consisting of sintered metallic fiber, sintered metallic powder and metallic honeycomb. The spinel compound layer is soluble in sodium hydroxide and thus allows simple removal and replacement, without machining, of the abradable material.

DESCRIPTION OF THE PREFERRED EMBODIMENT

In a preferred embodiment, a compressor casing is provided with an interior lining of the inventive composite abradable construction. The substrate alloy to which the abradable construction is applied may be an alloy of either nickel or titanium. In general, the substrate is first provided with a nickel aluminide undercoating, then an inorganic binder coating and finally the abradable surface material.

The nickel aluminide layer forms a bond between the substrate and the inorganic binder layer which is improved over that which is formed directly between the binder and substrate. It provides a strong metallurgical bond to both and when thermally sprayed has the advantage of providing an irregular surface for good mechanical bonding with the binder layer. In addition, when applied as a continuous layer 0.005–0.010 inch thick, it acts as a last rub barrier to wear down the blade tips and prevent rubbing contact between the blade and the casing, which, when both are titanium, pose the threat of titanium fires.

Although several methods of applying the first coating are available, the most satisfactory results are obtained by means of thermal spraying. This process is inherently flexible since it permits the coating material to be selected and premixed in powder form before spraying, and because close control can be exercised over the spraying process.

Flame spraying is a coating process in which powdered material is injected into a flame, melted, and subsequently carried in a molten state and deposited on a substrate by a gas jet. The flame is produced by the combustion of hydrogen or acetylene with oxygen or air. The carrier gas is usually air or one of the inert gases. The efficiency and quality of the coating process depends on the flame temperature and heat production rate, the gas flow rates, the powder feed rate, and the distance between the substrate and the spray gun. Adjustment of the gas flow rates changes the combustion rate and the time that the particles remain in the combustion zone. Changing the substrate-to-gun distance changes the particle cooling time before impact and is probably the most important spraying parameter.

Plasma spraying is similar to flame spraying except that the heat is derived from an electrical arc and no combustion products are produced. Considerably more energy is generated during plasma spraying than during flame spraying however, and the temperature produced is around 25,000°F whereas the maximum temperature produced by flame spraying is about 3,600°F. As a result, the coatings produced by the two processes have somewhat different properties.

The nickel aluminide coating is preferably formed by plasma spraying nickel-coated aluminum powders known commercially as Metco 404, as the feed material, the powder analyzing at, by weight, approximately 80% nickel, 20% aluminum. The aluminum and nickel mixture in this form is both exothermic and synergistic and will form a strong metallurgical bond with a nickel or titanium alloy substrate when applied from a plasma gun.

In the alternative, the nickel aluminide coating may be formed by flame spraying a nickel-coated aluminum rod known commercially as Metco 405, the rod analyzing at, by weight, approximately 80% nickel, 20% aluminum.

In general, it will be appreciated that prior to spraying, the surface to be coated is cleaned and degreased by conventional means such as trichloroethylene or perchloroethylene and is also preferably roughened by grit blasting. Subsequent to spraying, the nickel aluminide coating is provided with the binder coating.

The inorganic binder layer is applied to a thickness of approximately 0.005–0.050 inch by trowelling a compound of material consisting essentially of, by weight, 20–40% sodium silicate, 55–75% aluminum and 2–8% zinc oxide, preferably 25–35% sodium silicate, 60–70% aluminum and 3–7% zinc oxide, and optimally 35% sodium silicate, 65% aluminum and 5% zinc oxide. A cement, known commercially as SermeTel 481 sold by Teleflex Inc., has been found suitable for use. The cement is of the two component type, wherein the first component comprises a compound of sodium silicate and aluminum particles having a viscosity of 24 to 26 sec. at 77°F ± .5° (using a No. 5 Zahn cup) and the second component is a reactor comprising zinc oxide powder which, after the air curing procedure hereinafter described, causes formation of the water insoluble spinel $Al_2O_3 \cdot SiO_2$. In use, the compound is thoroughly blended with the reactor in a ratio of 25 ml of compound to 1 gram of reactor in a clean, lidded container. After blending, the container is sealed and the compound is allowed to stand for a minimum of 18 hours to allow for a complete reaction. The cement is then applied to the substrate by brush, spatula or by extrusion. It may be applied as a single layer or in several successive layers until the desired thickness is established. Within five minutes of application of the cement, the abradable surface material, typically in strip form, is assembled and loaded uniformly to 200 ± 25 psi against the binder.

Following assembly of the abradable strip, the binder is cured in air in a manner to get rid of all water without causing blisters while forming into a spinel compound referred to herein as an air cured reaction product. In general, the binder is dehydrated by exposing to a temperature below 212°F for a period sufficient to drive off nearly all (about 80–95%) of the moisture. The binder is then heated to a temperature above 700°F (but not above about 1,000°F) for a period sufficient to get rid of all remaining moisture and cause water insoluble spinel ($Al_2O_3 \cdot SiO_2$) complex formation. In particular, the following schedule has been found satisfactory. Air dry while loaded to 200 ± 25 psi for 2 hours, place hardware in a room temperature circulating oven, raise the temperature to 200°± 10°F and hold for 1 hour, remove pressure and heat to 400°± 10°F, hold for 1 hour, heat to 600°± 10°F, hold for 1 hour and heat to 1,000°± 20°F and hold for 1 hour.

As will be appreciated, the efficacy of the composite depends to a large extent on both the strength of the binder material (cohesive strength) as well as on the strength of the bond between the abradable material and the binder material (adhesive strength). It has been found that thickness of the inorganic binder is critical in achieving success in this regard and such thickness varies according to the type of abradable material imposed thereon. In the case of sintered metallic fiber or sintered metallic powder strips which are typically 5–35% dense, preferably 15–22% dense, the binder thickness must be no greater than 0.015 inch, preferably no greater than 0.010 inch, else porosity results causing loss of cohesion, due apparently to improper binder flow or cure. This porosity occurs even if the loading pressure is varied from 20 to 400 psi. With the same abradable material and a binder thickness less than 0.005 inch, there is not enough binder present to achieve good bonding and there occurs a substantial loss of adhesive strength.

One of the significant features of the present seal is the fact that the binder may, because of its solubility in sodium hydroxide, be easily removed without machining. It will thus be appreciated that the replacement of abradable materials has been made simple, economical and effective.

With the metallic honeycomb, the binder is suitably 0.010–0.050, preferably 0.020–0.030, inch thick. With greater binder thicknesses, the honeycomb cells tend to fill with binder which is not itself satisfactorily abradable and with lower binder thicknesses, bond strength is unacceptable.

In order to promote a clear understanding of the present invention, the following illustrative examples are described.

Example I

Nine strips of titanium alloy (minimal composition Ti-8Al-1Mo-1V) 5 inches long, 0.333 inch wide and 0.010 inch thick were flame sprayed with a 0.005–0.010 inch thick coating of nickel aluminide using a Metco 405 rod. The coated area was cleaned with a residue free solvent of trichloroethylene. An inorganic binder of SermeTel 481 was blended and prepared as above-described, cooled to 35°–40°F and applied to a thickness of 0.008 ± 0.002 inch with a spatula. Within 5 minutes of the inorganic binder application, a 19% dense strip of Hast-X Feltmetal (sintered metallic fibers of 22.0Cr-1.5Co-0.10C-18.5Fe-9.0Mo-0.6W-Bal Ni0.070-0.080 inch thick commercially available from Huyck Metals) was applied to the binder surface under a uniform pressure of 200 ± 25 psi in air for 2 hours. The samples were then placed in an air circulating oven at room temperature and the temperature was raised to 200° ± 10°F and held at that temperature for 1 hour. The article was then removed from the oven and the cure cycle continued without pressure in air at 400° ± 10°F for 1 hour, 600° ± 10°F for 1 hour and 1,000° ± 20°F for 1 hour and finally air cooled.

The test specimens were subjected to thermal cycling by being moved into and out of an induction furnace every 2 minutes. Test duration was 1,000 cycles or to failure. As seen in Table I below, test specimens cycled between 300°–800°F and then evaluated for bond strength in shear showed that the inorganic binder was not affected by the cycling and the bond remained greater than the shear strength of the Feltmetal abradable. When temperature exposure was increased to 1,050°F, failure occurred in the binder prior to the established 1,000 cycles. It was determined that the binder is suitable for continuous use at temperatures up to 1,000°F.

TABLE I

TENSILE ADHESION VALUES AFTER THERMAL SHOCK TEST

| Temperature Range of Cycle, °F | Number of Cycles | Bond Strength in Shear, psi | Failure |
|---|---|---|---|
| 300–800 | 1,000 | 1,037 | Feltmetal |
| 300–800 | 1,000 | 1,005 | Feltmetal |
| 300–800 | 1,000 | 1,057 | Feltmetal |
| 300–800 | 1,000 | 957 | Feltmetal |
| 300–1,000 | 1,000 | 1,030 | Feltmetal |
| 300–1,000 | 1,000 | 647 | Feltmetal |
| 300–1,050 | 175 | — | Binder |
| 300–1,050 | 375 | — | Binder |
| 300–1,025 | 970 | — | Binder |

Example II

A plurality of strips (four inches long, 1 inch wide and 0.080 inch thick) of Inconel X-750 (nominal composition: 15.5Cr-0.08C-7.0Fe-2.5Ti-0.7Al-1.0Cb + Ta-Bal Ni) and Inconel 718 (nominal composition: 18.5Cr-0.10C-18.0Fe-0.9Ti-0.6Al-3.0Mo-5.0Cb + Ta-Bal Ni) were degreased with trichloroethylene and grit blasted with 90 grit aluminum oxide. Some of the strips were flame sprayed as in Example I to provide a nickel aluminide coating 0.001–0.005 inch thick. All of the strips were then coated, by trowelling, with an inorganic binder of SermeTel 481 to a thickness of either 0.010–0.020 inch or 0.030–0.040 inch. Immediately (within 5 minutes) Hastelloy X honeycomb (nominal composition: 22.0Cr-1.5Co-0.10C-18.5Fe-9.0Mo-0.6W-Bal Ni) 1 inch long, ½ inch wide and 0.060 inch thick having 0.032 inch cell size was clamped firmly (1–2 psi) against the binder and the following cure schedule was adhered to:

(1) 10–12 hours air dry at room temperature.
(2) Bake in air 10–12 hours at 175° ± 15°F.
(3) Remove clamps.
(4) Bake in air 60 ± 10 minutes at 400° ± 15°F.
(5) Bake in air 60 ± 10 minutes at 600° ± 25°F.
(6) Bake in air 60 ± 10 minutes at 1,000° ± 50°F.

Bond strengths of composite specimens so made were measured by overlap shear testing and were evaluated as a function of binder coating. Shear adhesion test results (see Table II) showed that a binder thickness of 0.010–0.020 inch was only marginally satisfactory since, in all cases, failure was caused by the honeycomb pulling out of the binder. With a binder thickness of 0.030–0.040 inch, all failures were either adhesive failures at the binder-honeycomb interface of cohesive failures of the binder itself. With respect to NiAl undercoating, it can be seen that while fair adhesion does exist without it, its presence is preferred since it improves adhesion while simultaneously providing a last-chance rub barrier.

TABLE II

HONEYCOMB SHEAR ADHESION VALUES

| Substrate | NiAl Undercoat | Binder Thickness (inch) | Average Shear Adhesion (psi) |
|---|---|---|---|
| Inconel X-750 | No | 0.010–0.020 | 1,190 |
| Inconel 718 | No | " | 1,187 |
| Inconel X-750 | No | 0.030–0.040 | 1,331 |
| Inconel 718 | No | " | 1,422 |
| Inconel X-750 | Yes | 0.010–0.020 | 1,290 |
| Inconel 718 | Yes | " | 1,185 |
| Inconel X-750 | Yes | 0.030–0.040 | 1,390 |
| Inconel 718 | Yes | " | 1,573 |

Thermal shock testing was performed on Inconel 718 specimens having an NiAl undercoat and a binder thickness of 0.030–0.040 inch by heating the samples to 660°F in a circulating air oven, allowing them to equilibrate for 30–45 minutes, removing and immediately water quenching in room temperature water. The samples were then reinserted into the oven and the cycle repeated. At the conclusion of five cycles, overlap shear testing gave an average shear adhesion of 1,254 psi which is comparable to samples which were not subjected to thermal shocking.

What has been set forth above is intended primarily as exemplary to enable those skilled in the art to practice the invention and it should therefore be understood that, within the scope of the appended claims, the invention may be practiced in ways other than as specifically described.

What is claimed is:

1. An abradable seal for use between two relatively rotatable members in elevated temperature operating apparatus comprising:
   a nickel aluminide coating approximately 0.005–0.010 inch thick bonded to one of said members;
   a voidless, inorganic water insoluble spinel compound layer approximately 0.005–0.05 inch thick bonded to said nickel aluminide coating consisting essentially of the air cured reaction product of, by weight, 20–40% sodium silicate, 55–75% aluminum and 2–8% zinc oxide; and
   an abradable material bonded to said inorganic binder coating selected from the group consisting of sintered metallic fiber, sintered metallic powder and metallic honeycomb.

2. The invention of claim 1 wherein said spinel compound layer consists essentially of the air cured reaction product of, by weight, 25–35% sodium silicate, 60–70% aluminum and 3–7% zinc oxide.

3. The invention of claim 1 wherein said spinel compound layer consists essentially of the air cured reaction product of approximately, by weight, 30% sodium silicate, 65% aluminum and 5% zinc oxide.

4. The invention of claim 1 wherein said spinel compound layer is 0.005–0.015 inch thick and said abradable material is sintered metallic fiber of sintered metallic powder 5–35% dense.

5. The invention of claim 1 wherein said spinel compound layer is 0.010–0.050 inch thick and said abradable material is metallic honeycomb.

* * * * *